(12) United States Patent
Jung et al.

(10) Patent No.: US 7,098,112 B2
(45) Date of Patent: Aug. 29, 2006

(54) PREPARATION OF FIELD EMISSION ARRAY COMPRISING NANOSTRUCTURES

(75) Inventors: Kyeong-Taek Jung, Suwon-si (KR);
Myung-Soo Kim, Seoul (KR);
Kwan-Goo Jeon, Jeonju-si (KR);
Seog-Hyun Cho, Seoul (KR)

(73) Assignee: Samsung Corning Co., Ltd., (KR)

( * ) Notice: Subject to any disclaimer, the term of this patent is extended or adjusted under 35 U.S.C. 154(b) by 0 days.

(21) Appl. No.: 10/865,578

(22) Filed: Jun. 9, 2004

(65) Prior Publication Data

US 2004/0253758 A1    Dec. 16, 2004

(30) Foreign Application Priority Data

Jun. 13, 2003    (KR)    .................... 10-2003-0038236

(51) Int. Cl.
*H01L 21/331*    (2006.01)

(52) U.S. Cl. ...................... 438/309; 438/338; 977/949; 977/939; 977/759; 257/E51.04

(58) Field of Classification Search ................. 438/22, 438/309, 338; 977/949, 939, 759; 257/E51.04
See application file for complete search history.

(56) References Cited

U.S. PATENT DOCUMENTS

2004/0067602 A1*    4/2004    Jin ............................. 438/22
2005/0006754 A1*    1/2005    Arik et al. .................. 257/712

\* cited by examiner

*Primary Examiner*—Matthew Smith
*Assistant Examiner*—Nicholas Tobergte
(74) *Attorney, Agent, or Firm*—Anderson Kill & Olick, PC

(57) ABSTRACT

A field emission array which does not contain any organic material is manufactured by separately preparing nanostructures whose one ends were coated and then adhering the coated ends of the nanostructures to a metal electrode layer formed on a substrate.

7 Claims, 3 Drawing Sheets

PREPARATION OF FIELD EMISSION ARRAY COMPRISING NANOSTRUCTURES

FIELD OF THE INVENTION

The present invention relates to a method for preparing a field emission array comprising nanostructures as a field emission source in a large area, with using no separate organic material.

BACKGROUND OF THE INVENTION

Nanostructures such as carbon nanofibers, cabon nanotubes, carbon nanohorns and nanowires containing Si, Ge, an alloy of III and V-group elements (e.g., GaAs, GaP, InAs/P) or an alloy of II and VI-group elements (e.g., ZnS, ZnSe, CdS, CdSe) have good mechanical strength, heat- and electro-conductivity and chemical stability, suitable for various industrial applications.

In particular, when used as an emission source of a field emission array in an electronic device, the nanostructure is capable of increasing the work function and lowering the driving voltage due to its high aspect ratio (=length/diameter), as compared to a conventional field emission source such as an Mo tip (see FIG. 1). Such a field emission array comprising a nanostructure field emission source can be prepared by directly growing nanostructures on a patterned electrode layer formed on a supporting plate using a chemical vapor deposition, as disclosed in Korean Patent Publication No. 2001-91389. However, the method is not suitable for the preparation of a field emission array having a large area.

In order to overcome the above problem, there has been reported a method of preparing a field emission array by screen printing on a patterned electrode layer formed on a supporting substrate a paste or slurry composition comprising carbon nanostructures in combination with an organic binder and an organic dispersing agent (Korean Patent Publication Nos. 2000-61757 and 2000-20870). A schematic diagram of a field emission array prepared by this method, which comprises a substrate/electrode layer (10) and a layer of nanostructures (30) fixed thereto by a paste medium (20), is shown in FIG. 2.

Such a screen printing method makes a preparation of a large-area field emission array possible, but has a problem in that organic materials remaining in the nanostructure layer generate undesired gases under an evacuated condition, lowering the display efficiency.

For the purpose of solving this problem, there have been reported a method of further adding into the paste or slurry composition a heat-decomposition accelerator to heat-decompose organic materials (Korean Patent Publication No. 2001-109538) and a method of applying a voltage to a mixed solution of a polymer precursor and a carbon nanostructure to carry out in situ electrochemical polymerization (Korean Patent Publication No. 2001-17543). However, these methods cannot completely eradicate the problem associated with using an organic material.

SUMMARY OF THE INVENTION

Accordingly, it is an object of the present invention to provide a method for preparing a large-area field emission array comprising nanostructures that obviates the use of an organic material.

In accordance with one aspect of the present invention, there is provided a method for preparing a field emission array which comprises the steps of;

(1) forming a metal catalyst layer on a first substrate and then growing a plurality of nanostructures on the catalyst layer;

(2) coating one end of each grown nanostructure with at least one material selected from the group consisting of a metal, an alloy, and an oxide, nitride, carbide, sulfide and chloride thereof;

(3) isolating the one end-coated nanostructures from the first substrate and placing them on a patterned metal electrode layer formed on a second substrate; and (4) allowing the coated ends of the nanostructures to adhere to the metal electrode layer.

BRIEF DESCRIPTION OF THE DRAWINGS

The above and other objects and features of the present invention will become apparent from the following description of the invention, when taken in conjunction with the accompanying drawings, which respectively show.

Figure 1:
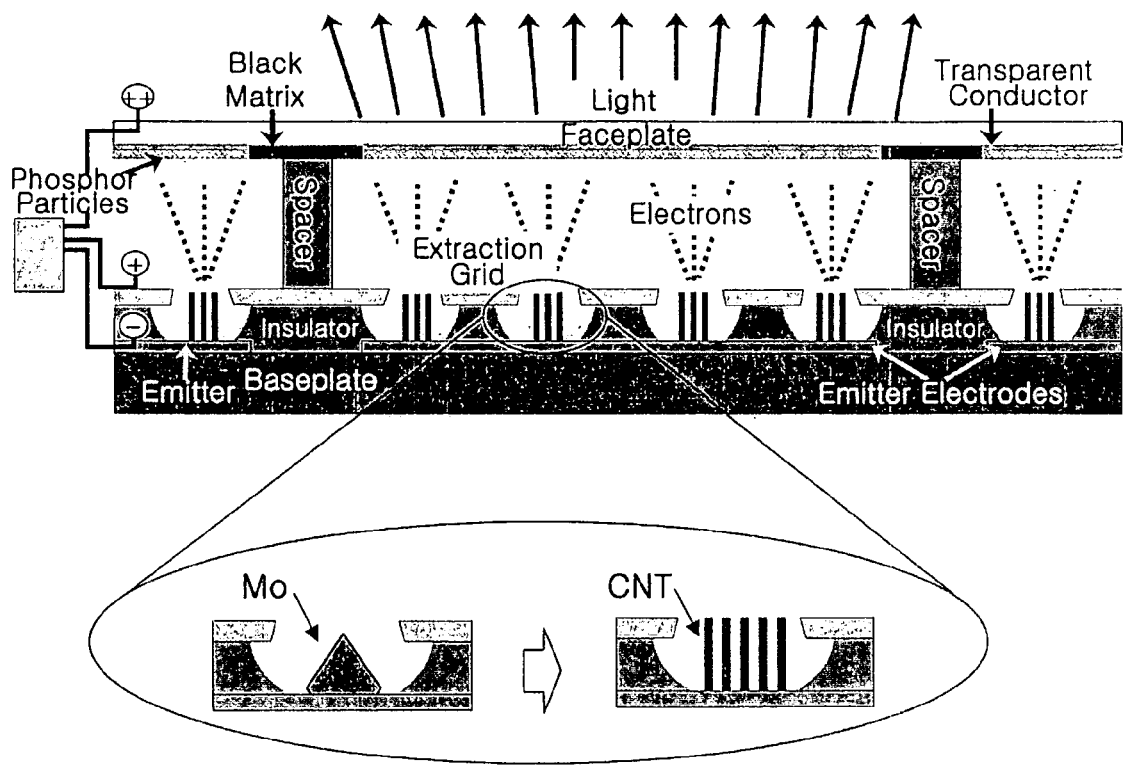
FIG. 1: a schematic diagram of a field emission device comprising a field emission array having an Mo tip or carbon nanotubes.
Figure 2:
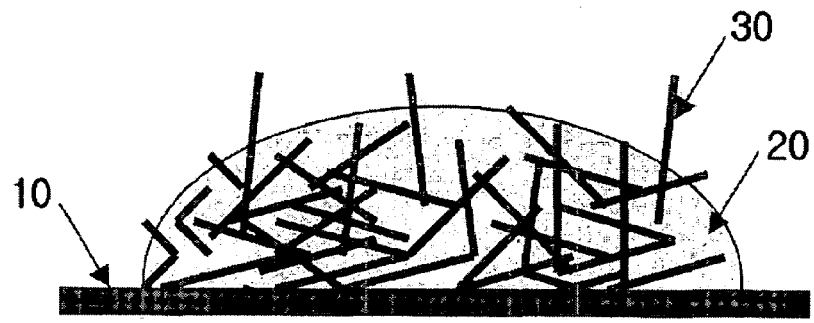
FIGS. 2 and 3: schematic diagrams of a conventional field emission array prepared using an organic material-containing paste and the field emission array prepared in accordance with the inventive method, respectively.

| 10: substrate/electrode layer | 20: paste |
| 30: nanostructure | 40: coated part |

DETAILED DESCRIPTION OF THE INVENTION

The method of the present invention comprises adhering, to a metal electrode layer formed on a substrate, nanostructures whose one ends are coated with at least one material selected from the group consisting of a metal, an alloy, and an oxide, nitride, carbide, sulfide and chloride thereof, without using a separate organic material.

<Step (1)>

After a metal catalyst layer is formed on a first substrate by a conventional chemical or physical deposition method, nanostructures are grown on the catalyst layer by a conventional nanostructure manufacturing method known in the art, e.g., arc discharge, laser, thermal decomposition, thermal chemical vapor deposition (CVD), plasma enhanced CVD, microwave plasma CVD and fluidization methods.

The metal catalyst layer may be composed of at least one material selected from the group consisting of a metal (i.e., Li, K, Mg, Ca, Sc, Y, La, Ac, Ti, Zr, Hf, V, Nb, Ta, Cr, Mo, W, Mn, Co, Ni, Ru, Rh, Pd, Os, Ir, Pt, Cu, Zn, B, Al, Ga, In, Si, Ge, Sn, P, As, Sb), an alloy, and an oxide, nitride, carbide, sulfide, chloride, nitrate and sulfonate thereof. The first substrate employed in the present invention may be a glass, carbon, silicon, metal, polymer and composite plate thereof.

The layer of the grown nanostructures may be a mono-, double- or multi-layer, and the nanostructures such as carbon nanofibers, cabon nanotubes, carbon nanohorns and nanowires may have a length ranging from 0.1 to 100 μm and a diameter ranging from 1 to 100 nm.

<Step (2)>

One ends of the nanostructures grown in step (1) are coated with at least one material selected from the group consisting of a metal, an alloy, and an oxide, nitride, carbide, sulfide and chloride thereof, by a conventional coating method, e.g., sputtering, vacuum vapor deposition, fluidization, thermal CVD, atomic layer CVD, ion exchange and redox reaction methods. The coating material is preferably the same as the constituent of the metal electrode layer. Substantially, such selective coating on one end of the nanostructure may be achieved by controlling various coating conditions such as the coating rate, the amount of the coating material and the like.

If necessary, the coating may be performed in two or more steps, and prior to the coating, the grown nanostructures may be surface-treated with at least one material selected from the group consisting of ozone, nitrogen oxide($NO_x$), ammonia, hydrogen cyanide (HCN), sulfoxide ($SO_x$), chlorine, carbon dioxide, hydrochloric acid, nitric acid, fluoric acid, phosphoric acid, sulfuric acid, hydrogen peroxide, potassium permanganate, chlorine dioxide, potassium iodide, pyridine and hydrogen sulfide, to enhance their functional property. For example, the nanostructures may be surface-treated by dipping them in a solution comprising the above surface treating agent, followed by a ultrasonic wave-treatment or heating at 50 to 300° C., or by bringing a vapor of the above surface treating agent into contact with them in a reactor.

<Step (3)>

The nanostructures of which one ends were coated, obtained in step (2), are isolated from the first substrate by a conventional dry or wet harvesting method using a cutter or laser.

Then, the isolated nanostructures are placed on a patterned metal electrode layer formed on a second substrate by a conventional method, e.g., liquid-phase coating, dispersing using a sieve, static electricity coating, adhesion using a photoresist and spray methods.

The metal electrode layer and the second substrate, respectively, may be of any conventional materials used in the preparation of a field emission array.

<Step (4)>

The second substrate/electrode layer and the nanostructures which are placed thereon in step (3) are heated at a temperature ranging from 100 to 1500° C. for 1 min to 15 hrs under an air or inert atmosphere to allow the coated ends of the nanostructures to adhere to the metal electrode layer. Besides the heat treatment, such adhesion may also be achieved by applying a duplicating principle using the coated nanostructures as a toner. When the electrode layer and the coated part of the nanostructure are made of the same material, generation of defects therebetween can be minimized.

Figure 3:
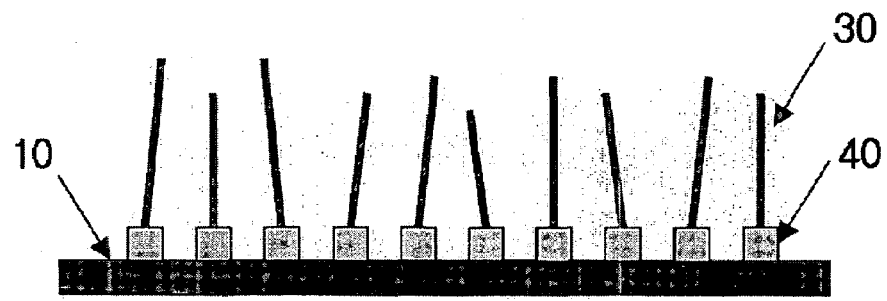

In accordance with the present invention, there is provided a field emission array comprising a metal electrode layer and a layer of nanostructures, one end of each nanostructure being coated with at least one material selected from the group consisting of a metal, an alloy, and an oxide, nitride, carbide, sulfide and chloride thereof, wherein the electrode layer and the coated ends of the nanostructures are bonded to each other. A schematic diagram of a field emission array prepared by the inventive method is shown in FIG. 3.

The inventive field emission array does not contain any organic material in the nanostructure layer, thereby eliminating the problem of generating undesired gases, and, due to the strong bonding between the electrode and nanostructure layers, it can be conveniently manufactured in a large size and is capable of lowering the power consumption. The inventive field emission array can be advantageously employed in the preparation of field emission displays, liquid crystal displays, fluorescent lamps, atomic force microscopes, sensors, secondary batteries, fuel cells and the like.

The following Example is given for the purpose of illustration only, and is not intended to limit the scope of the invention.

EXAMPLE

A nickel thin layer was formed on a silicon substrate by way of sputtering nickel at 5 W for 20 to 30 min, placed in a thermal chemical vapor deposition apparatus and heated to 700° C. Then, a 1:2 mixture of $C_2H_2$ and Ar was introduced to the apparatus to vertically grow carbon nanotubes on the nickel layer for 40 min under the pressure of 5 torr. Exposed ends of the grown carbon nanotubes were coated with Ag by sputtering Ag at 5 W for 5 min. The end-coated carbon nanotubes were harvested from the silicon substrate using a knife and placed on a patterned Ag electrode layer formed on a glass substrate using a static electricity coating method. The glass substrate/Ag electrode layer and the carbon nanotubes were heat treated at 550° C. for 30 min in an electric furnace under an inert atmosphere, to allow the coated part of the carbon nanotube to adhere to the Ag electrode layer, to obtain a field emission array in accordance with the present invention.

Figure 4:
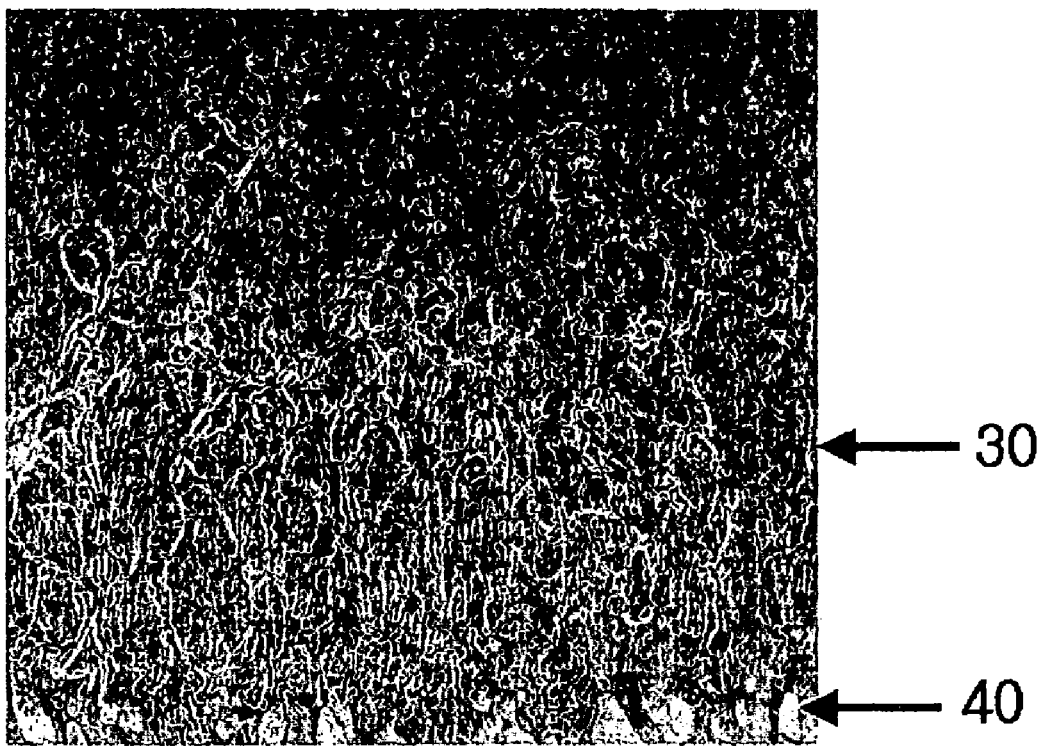
FIG. 4: an electronic microscope photograph of the carbon nanotubes vertically raised on an electrode according to Example.

An electric field was applied to the field emission array obtained above, and an electronic microscope photograph of the resultant (the carbon nanotubes vertically raised on the electrode layer) was taken (FIG. 4). The result of FIG. 4 shows that the coated ends of the carbon nanotubes are properly and uniformly attached to the electrode layer.

As described above, in accordance with the method of the present invention, a field emission array which does not contain any organic material and has a strong bonding between the electrode and nanostructure layer can be easily manufactured over a large area.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a field emission array which comprises the steps of:
    (1) forming a metal catalyst layer on a first substrate and then growing a plurality of nanostructures on the catalyst layer;
    (2) coating one end of each grown nanostructure with at least one material selected from the group consisting of a metal, an alloy, and an oxide, nitride, carbide, sulfide and chloride thereof;
    (3) isolating the one end-coated nanostructures from the first substrate and placing them on a patterned metal electrode layer formed on a second substrate; and
    (4) causing the coated ends of the nanostructures to adhere to the metal electrode layer formed on the second substrate.

2. The method of claim 1, wherein the metal catalyst layer formed in step (1) comprises at least one material selected from the group consisting of a metal, an alloy, and an oxide, nitride, carbide, sulfide, chloride, nitrate and sulfonate thereof.

3. The method of claim 1, wherein the nanostructures grown in step (1) are carbon nanofibers, carbon nanotubes, carbon nanohorns or nanowires.

4. The method of claim 1, wherein the nanostructures obtained in step (1) are surface-treated prior to step (2).

5. The method of claim 4, wherein the nanostructures are surface-treated with at least one material selected from the group consisting of ozone, nitrogen oxide($NO_x$), ammonia, hydrogen cyanide(HCN), sulfoxide($SO_x$), chlorine, carbon dioxide, hydrochloric acid, nitric acid, fluoric acid, phosphoric acid, sulfuric acid, hydrogen peroxide, potassium permanganate, chlorine dioxide, potassium iodide, pyridine and hydrogen sulfide.

6. The method of claim 1, wherein the material used for the coating step (2) is the same as the constituent of the metal electrode layer.

7. The method of claim 1, wherein the adhesion step (4) is conducted by heating at a temperature ranging from 100 to 1500° C.

* * * * *